Patented Nov. 4, 1941

2,261,237

UNITED STATES PATENT OFFICE 2,261,237

MANUFACTURE OF CELLULOSE DERIVATIVES

Henry Dreyfus, London, England

No Drawing. Application October 3, 1939, Serial No. 297,679. In Great Britain October 17, 1938

2 Claims. (Cl. 260—227)

This invention relates to improvements in the manufacture of cellulose derivatives and particularly in the manufacture of organic acid esters of cellulose.

In the manufacture of chemical wood pulps the wood, after it has been freed from bark, is generally cut up into small pieces and purified by heating it with a liquor which may contain, for example, sodium bisulphite or sodium hydroxide. After subjection to any further treatments which may be necessary, for example bleaching, it is then washed and converted into sheet or other suitable form for marketing.

Many attempts have been made to employ chemical wood pulps in the manufacture of cellulose acetate and other organic acid esters of cellulose but, in general, it has been found that these starting materials are not so satisfactory as cotton linters since it is difficult to obtain a uniform esterification and a product which is completely soluble in organic solvents to give solutions of good clarity.

I have now discovered that improved results may be obtained in the manufacture of organic acid esters from chemical wood pulp if the pulp is treated with a solution of sulphuric acid in such proportion as to incorporate a small amount of acid in the pulp, for example an amount equal to about 2% of the dry weight of the pulp. The pulp may, for example, be soaked with an aqueous solution of sulphuric acid and then centrifuged, the concentration of the acid employed being such that after centrifuging the required amount of sulphuric acid remains in the pulp. The moisture content of the centrifuged material may be and preferably is reduced by a drying operation, e. g. by blowing air through it at a moderate temperature, e. g. 20° or 40° C., until a product containing e. g. only 10 and 5% or even less of moisture is obtained. If the pulp contains a small amount of sodium hydroxide, sodium bisulphite or other compound which will react with the sulphuric acid, e. g. 2-4%, as may happen in the case of chemical wood pulps, the amount of acid employed should be adjusted so that the treated pulp contains a small amount of free acid as described above.

The pulp thus treated may, if desired, be subjected to further pretreatments, for example with acetic acid or other organic acid in the liquid or vapour form, and may then be converted into an organic acid ester of cellulose using acetic anhydride, propionic anhydride or other organic acid anhydride. The esterification may be carried out in the presence of an organic acid, for example acetic acid or other solvent for the cellulose ester produced, or in the presence of a non-solvent diluent, for example benzene or an ether. An additional quantity of sulphuric acid may be incorporated in the reaction mixture in order to assist the reaction or another catalyst may be used, for example perchloric acid or a perchlorate, for example sodium or magnesium perchlorate. The cellulose ester obtained may be ripened either in solution or in suspension and may be employed for the manufacture of artificial filaments, yarns, foils, films, moulding powders and other industrial products.

The invention has been described above in relation to the use of sulphuric acid for the treatment of the pulp since this acid has been found to give the best results. However, other mineral acids may also be employed if desired, for example phosphoric acid, preferably in conjunction with sulphuric acid, or perchloric acid.

Example 100 parts of chemical wood pulp are thoroughly impregnated by immersion in about 400–500 parts of 2% sulphuric acid. They are then withdrawn, centrifuged until they retain only about 50–100 parts of liquid and then dried by passing a current of air at about 30–40° C. through them until they have a moisture content of about 10–15%. They are then introduced into about 150 parts of glacial acetic acid containing about 100 parts of acetic anhydride to destroy the residual water, the temperature of the liquid being kept down by cooling. A mixture of 250 parts of glacial acetic acid and 300 parts of acetic anhydride containing 10 parts of sulphuric acid is then added with stirring and acetylation is carried out with stirring at a temperature not exceeding 30° C. until a clear dope is obtained. The cellulose acetate is then ripened by incorporating with the dope sufficient water in the form of dilute acetic acid to destroy excess acetic anhydride and provide an amount of water equal to about 30% of the weight of the cellulose acetate. Ripening is continued until an acetone-soluble cellulose acetate is obtained. The product is then precipitated, stabilised in the ordinary way, washed and dried.

Having described my invention, what I desire to secure by Letters Patent is:

1. Process for the production of cellulose esters of lower fatty acids, which comprises treating chemical wood pulp with an aqueous solution of sulphuric acid, the sulphuric acid being present in said solution in such proportion as to incorporate up to 5% thereof in the pulp, removing the excess of the aqueous solution and reducing the moisture content of the pulp to 10 to 15% by evaporation, destroying the residual water by treating the pulp with a mixture of a lower fatty acid and a lower fatty acid anhydride, and then esterifying the pulp with an esterification medium containing a lower fatty acid and a lower fatty acid anhydride.

2. Process for the production of cellulose acetate, which comprises treating chemical wood pulp with an aqueous solution of sulphuric acid, the sulphuric acid being present in said solution in such proportion as to incorporate up to 5% thereof in the pulp, removing the excess of the aqueous solution and reducing the moisture content of the pulp to 10 to 15% by evaporation, destroying the residual water by treating the pulp with a mixture of acetic acid and acetic anyhdride, and then acetylating the pulp with an acetylation medium containing acetic acid and acetic anhydride.

HENRY DREYFUS.